United States Patent [19]

Panchu

[11] 4,345,954
[45] Aug. 24, 1982

[54] METHOD OF MAKING LAMINATES

[75] Inventor: Paul Panchu, Jamaica Plain, Mass.

[73] Assignee: Polaroid Corporation, Cambridge, Mass.

[21] Appl. No.: 23,310

[22] Filed: Mar. 23, 1979

[51] Int. Cl.³ .......................................... H01M 6/12
[52] U.S. Cl. ..................................... 156/87; 156/247; 156/323; 156/324; 429/112; 429/162
[58] Field of Search ................. 156/87, 247, 323, 324; 428/323, 328; 429/122, 149, 152, 153, 160, 162, 112

[56] References Cited

U.S. PATENT DOCUMENTS

| | | | |
|---|---|---|---|
| 2,058,703 | 10/1936 | Malivert | 156/83 |
| 3,112,235 | 11/1963 | Blanchard | 156/310 |
| 3,256,121 | 6/1966 | Abell | 156/247 |
| 3,708,349 | 1/1973 | Macaulay | 136/175 |
| 4,003,777 | 1/1977 | Eddy | 156/324 |
| 4,124,742 | 11/1978 | Land et al. | 429/122 |
| 4,125,685 | 11/1978 | Bloom et al. | 429/122 |
| 4,161,815 | 7/1979 | Land et al. | 156/324 |

Primary Examiner—Marion McCamish
Attorney, Agent, or Firm—John W. Ericson

[57] ABSTRACT

A process for making laminates of cellophane, conductive plastic, and metal powder, comprising laminating the sheet of cellophane to a sheet of conductive plastic with an intermediate composition comprising an aqueous dispersion of metal electrode particles and a binder, and drying the laminate to remove water from the dispersion.

20 Claims, 8 Drawing Figures

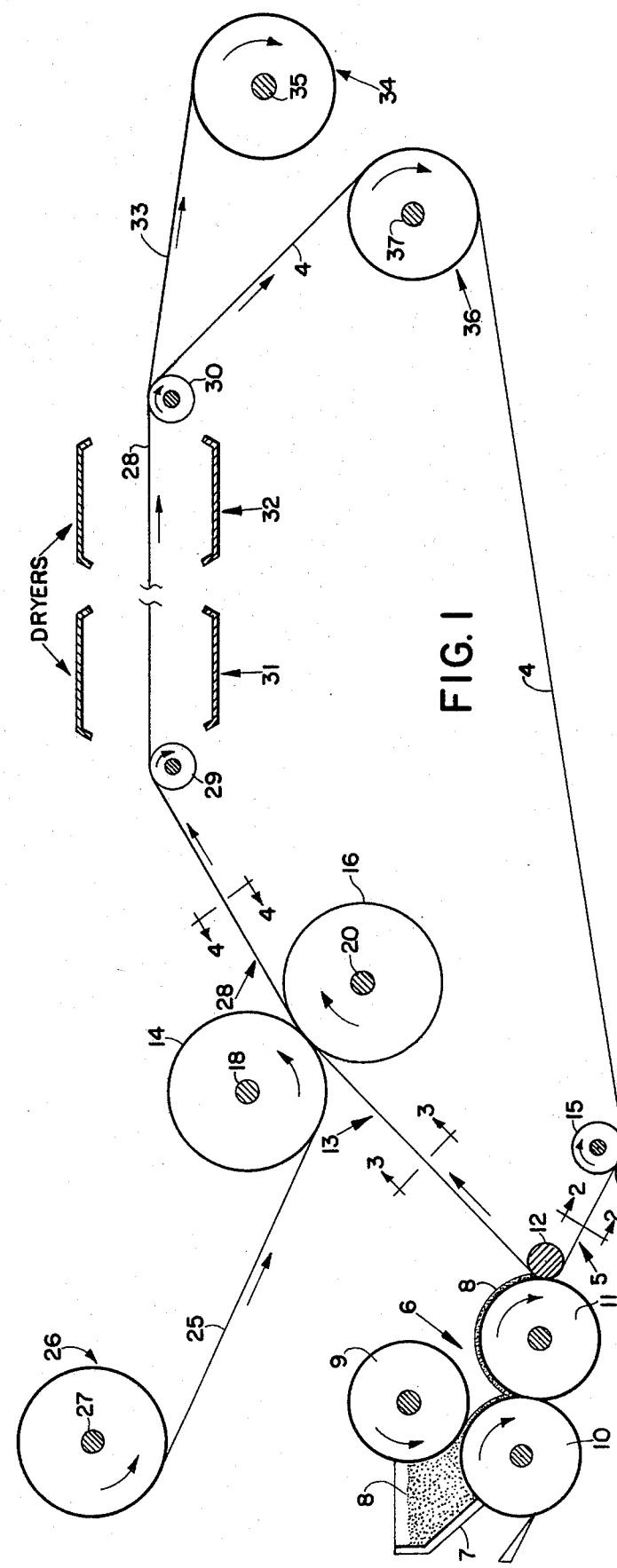

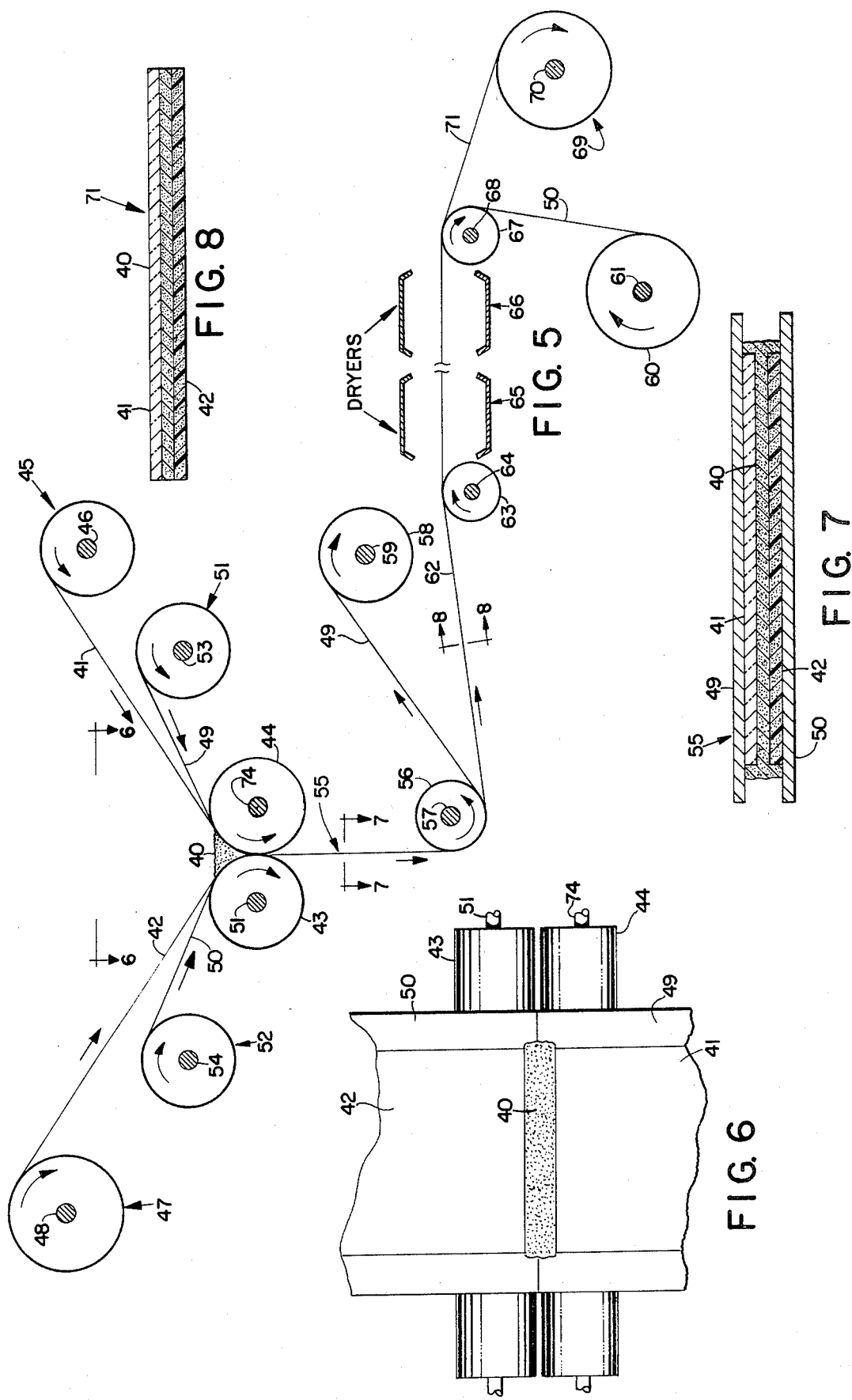

METHOD OF MAKING LAMINATES

This invention relates to the art of manufacturing laminar cells and batteries, and particularly to a novel method for making a triplex laminate useful therein.

In recent years the art of manufacturing laminar batteries has considerably advanced. Highly stable batteries with low internal impedance have been made available, and high volume manufacturing processes for making such batteries have been developed.

In one such manufacturing process, duplex electrodes are made by patch printing electrodes on opposite sides of a sheet of conductive plastic, and these printed sheets are subsequently cut into pieces for battery assembly. Such a method is shown and described, for example, in U.S. Pat. No. 3,708,349. Such a process involves problems in obtaining registration of the patches on opposite sides with each other, and of the location of the patches in the final cut duplex elctrodes in appropriate centered positions on the conductive plastic sheets.

More recently, processes have been developed for making batteries comprising sub-assemblies in which a conductive plastic sheet is laminated to an electrode layer completely covering one side of the sheet, and a separator is laminated to the electrode layer. Processes of this kind are described in U.S. Pat. No. 4,125,685, issued on Nov. 14, 1978 to Stanley M. Bloom, Charles K. Chiklis, and Gordon F. Kinsman for Electrical Cells and Batteries and Methods of Making the Same, and assigned to the assignee of this invention.

In accordance with the methods described in U.S. Pat. No. 4,125,685, in a particular embodiment, a layer of conductive plastic is laminated to a layer comprising a zinc anode dispersion, and a separator of cellophane is laminated to the zinc layer. In particular, the cellophane is first coated with a layer of a dispersion of zinc powder and a binder in an organic solvent. The solvent is then evaporated to dry the zinc dispersion, forming a dried adherent layer on the cellophane. The conductive plastic layer is then applied from an organic solvent dispersion of carbon and a soluble elastomeric compound, and that layer is then dried to remove the solvent to produce the resulting dried laminate. The use of organic solvent systems in coating and drying dispersions is obviously less desirable than the use of aqueous systems in the same manner. However, it was found that only by the use of organic solvent systems could the cellophane be coated without undersirable curling on drying.

Another approach to the problem of producing a laminate of cellophane, zinc and conductive plastic is described in U.S. Pat. No. 4,124,742, issued on Nov. 7, 1978 to Edwin H. Land and Gordon F. Kinsman for Electrical Cells And Batteries And Methods And Apparatus For Making The Same, and assigned to the assignee of this invention. In accordance with the disclosure of that patent, a conductive plastic sheet is coated with a dispersion of zinc in a aqueous system with a binder, dried, and then the zinc side is laminated to a cellophane sheet by passing the cellophane sheet and the zinc coated conductive plastic sheet between nip rollers, while supplying a very small amount of an aqueous solution of a water soluble bonding agent between the layers ahead of the nip between the rolls.

The object of this invention is to simplify the manufacture of triplex laminates, and particularly triplex laminates comprising a metal electrode particle layer between a cellophane layer and a conductive plastic layer.

The above and other objects of the invention are accomplished by a laminating process in which an aqueous dispersion of electrode particles and a binder is introduced between a sheet of conductive plastic and a sheet of cellophane and a laminate is formed under pressure in which the electrode particle dispersion initially exists in aqueous form in the laminate. In accordance with one embodiment of the invention, the zinc dispersion is introduced between the cellophane and conductive plastic between a pair of nip rolls through which the components pass to be laminated together. In a second and presently preferred embodiment of the invention, the aqueous zinc dispersion is first coated on the conductive plastic, and the cellophane sheet is then laminated to the zinc-coated conductive plastic.

The invention will best be understood in the light of the following description, together with the accompanying drawings, of various embodiments thereof.

In the drawings,

FIG. 1 is a schematic diagrammatic elevational sketch, with parts shown in cross section and parts omitted, illustrating a laminating process in accordance with a preferred embodiment of the invention;

FIG. 2 is a schematic cross sectional view of a portion of a laminate formed in the process illustrated in FIG. 1 as seen essentially along the lines 2—2 in FIG. 1;

FIG. 3 is a schematic cross sectional elevational view of a second laminate formed in the process of the invention, as seen essentially along the lines 3—3 in FIG. 1;

FIG. 4 is a schematic cross sectional elevational sketch of a laminate formed in a later stage of the process illustrated in FIG. 1, as seen essentially along the lines 4—4 in FIG. 1;

FIG. 5 is a schematic and diagrammatic elevational sketch, with parts shown in cross section and parts omitted, illustrating a process of lamination in accordance with a second embodiment of the invention;

FIG. 6 is a fragmentary schematic plan sketch, with parts omitted, showing a portion of the apparatus of FIG. 5 as seen essentially along the lines 6—6 in FIG. 5.

FIG. 7 is a schematic cross sectional sketch of a portion of the laminate formed in the process of FIG. 5 as seen essentially along the lines 7—7 in FIG. 5; and FIG. 8 is a schematic elevational sketch illustrating a triplex laminate made by the process of FIG. 5 as seen essentially along the lines 8—8 in FIG. 5.

Referring to FIG. 1, a supply of a first web 1 is taken from a supply roll 2 mounted on a shaft 3 that is journaled for rotation in the sense illustrated by the arrow. The web 1 comprises a sheet of conductive plastic. Condulon conductive plastic, as made and sold by Pervel Industries, Inc., the conductive plastic composition described in the above cited U.S. Pat. No. 4,125,685, or other conventional conductive plastic compositions may be employed. The conductive plastic sheet 1 may be from 1 to 10 mils in thickness, but is preferably on the order of 2 mils in thickness. The thickness of the sheet 1 is preferably chosen to be sufficient so that pinholes are unlikely to be found in it, and not materially thicker than this minimum thickness in order to conserve in the cost of materials.

The conductive plastic sheet 1 is temporarily joined with a carrier web 4 by passage between laminating rolls 15 and 16. The carrier web 4 may be in the form of an endless belt of paper, plastic or the like, having sufficient frictional engagement with the conductive plastic sheet 1 to carry it through various stages in the process to be described. Mylar polyester sheet 2 to 4 mils in thickness is a suitable material, which tends to cling to the conductive plastic sheet 1 electrostatically. The thickness of the web 4 should be sufficient to avoid stretching or tearing. The carrier web 4 may be lightly adhered to the conductive plastic sheet 1 in any conventional manner if so desired.

The composite web 5, comprising the conductive plastic sheet 1 and the carrier web 4 as shown in FIG. 2, next passes to a coating device, shown in FIG. 1 as a conventional reverse roll coater 6. The coater 6 may comprise a hopper 7 containing a supply of electrode dispersion 8. The dispersion 8 is supplied by a metering roll 9 to an applicator roll 10, and transferred to a second applicator roll 11 that deposits the composition 8 in the desired thickness onto the conductive plastic surface 1 of the composite web 1. As shown, the web 1 passes over a backbar 12 that aids in determining the thickness and uniformity of the electrode dispersion 8 on the conductive plastic layer 1. The appearance of the coated layer is as shown in FIG. 3.

Comparing FIGS. 1 and 3, the web 5, with its overcoating 8 of electrode dispersion, the whole being generally designated 13 in FIGS. 1 and 3, is next transferred to a pair of nip rolls 14 and 16. As suggested in FIG. 5, the nip roll 14 is mounted on a shaft 18 that is journaled in fixed bearings, not shown, for rotation in the sense shown by the curved arrow. Similarly, the roll 16 is mounted on a shaft 20 that is journaled for rotation in the sense indicated. The rolls 14 and 16 should be spaced by a fixed gap sufficient to allow the passage of the webs and coated dispersion between them under sufficient pressure to assure intimate contact.

Also supplied to the nip rolls 14 and 16 is a web 25 of separator material, preferably cellophane. The web 25 may be of any desired thickness, but preferably is between one-half and two mils, and for example 1.4 mil PUD-O cellophane as made and sold by E. I. DuPont de Nemours, Inc., of Wilmington, Del. The cellophane web 25 is taken from a supply roll 26 journaled for rotation in the sense indicated by the arrow on a suitable shaft 27.

The web emerging from the nip rolls 14 and 16 is generally designated 28; its structure is shown in FIG. 4. As the laminate 28 emerges from the nip rolls, the aqueous zinc composition layer 8 is still in wet form, and the process of dampening the cellophane layer 25 by diffusion has commenced. The web 28 passes over idler rollers 29 and 30 through dryers schematically indicated at 31 and 32. An appropriate arrangement for this purpose has been found to be two dryers each 15 feet in length and set at 200° F. when the coating speed is 15 feet per minute.

After passing over the idler 30, the release sheet 4 is stripped away from the rest of the laminate 33, the latter comprising the conductive plastic sheet 5, the dried zinc composition 8 and the cellophane layer 25. The laminate 33 may be taken up on a takeup roll 34, mounted on a shaft 35.

The carrier web 4 next passes over a driven roll 36 mounted on a shaft 37, and thence back to the laminating rolls 15 and 17. The wrap of the web 4 around the roll 36, and the degree of frictional engagement between the web 4 and the roll 36, should be sufficient to ensure a positive drive for the web 4 and the other webs 1 and 25. The shaft 37 may be arranged to be driven, in the sense indicated by the arrow, by a conventional electric motor or the like, not shown.

The takeup roll 37 is preferably driven in the sense indicated by the arrow through a conventional slip clutch, not shown, so that slack will continually be taken out of the web 33 with a limited tension on the web to avoid stretching or tearing it.

Various of the electrode dispersions known in the art comprising many different electrochemically active materials may be employed in practicing the invention. However, for the preparation of zinc anodes in accordance with a presently preferred embodiment of the invention, an appropriate electrode composition is as follows, in which amounts are given in parts by weight.

| Zinc Anode Composition | |
| --- | --- |
| $H_2O$ | 100 |
| Bentone LT | 0.5 |
| Tetrasodium pyrophosphate | 0.25 |
| Carbon Black | 5.0 |
| Polytex | 39.0 |
| Zinc | 1000 |

In the above composition, Bentone LT is an organic derivative of hydrous magnesium aluminum silicate, as made and sold by National Lead Company, Inc., of New York, N.Y., included primarily as a thickener. Polytex 6510 is an aqueous acrylic resin emulsion containing 65% solids, as made and sold by Celanese Corporation of Newark, N.J., serving as a binder. Various other conventional water soluble or dispersable binders may be employed. The tetrasodium pyrophosphate is a dispersing agent.

The above composition can be applied to any desired coatable thickness, but in one embodiment of the invention was applied to a dried coating weight of 16.92 milligrams per square centimeter.

Referring to FIGS. 5 through 8, a second embodiment of the invention is shown in which a separate coating device for the zinc or other electrode particle dispersion is not required. Instead, a supply of zinc dispersion 40 of the type described above is applied between a sheet of cellophane 41 and a sheet of conductive plastic 42 in the nip between a pair of laminating rolls 43 and 44 that are journaled for rotation in opposite directions and spaced by a fixed gap.

The cellophane sheet 41 is supplied from a supply roll 45 mounted on a suitable shaft 46 and journaled for rotation in the direction indicated by the arrow. Similarly, the conductive plastic sheet 42 is taken from a supply roll 47 mounted on a shaft 48 journaled for rotation in the direction indicated by the arrow.

Outside of the cellophane sheet 41 is supplied a wide sheet 49 of paper, plastic or the like, which has borders extending beyond the borders of the sheet 41. Similarly, a wide sheet 50 of paper or the like is supplied to the rolls outside the sheet 42 of conductive plastic. The sheets 49 and 50 are taken from supply rolls 51 and 52, journaled for rotation on shafts 53 and 54, respectively. As best shown in FIGS. 6 and 7, the supply of dispersion 40 is made ample to cover the sheets 41 and 42 to the edges, necessitating some overlap which is taken into account by the wide sheets 49 and 50.

As shown in FIGS. 5 and 6, the laminating rolls 43 and 44 may be of the same type described above in connection with FIG. 1. The roll 43 is mounted on a shaft 51 and the roll 44 is mounted on a shaft 74. The shafts 51 and 74 are journaled in fixed bearings, not shown. The rolls 43 and 44 are driven by the composite web 55 as it is pulled between them in the direction indicated by the arrows.

From the laminating rolls 43 and 44, the combined five-part laminated web 55, best shown in FIG. 7, passes to an idler roll 56 journaled on a shaft 57. As shown in FIG. 7, in the laminate 55, the zinc dispersion 40 may spill out somewhat at the edges, and this is prevented from falling into the apparatus by the wide edges of the sheets 49 and 50.

The gap between the rolls 43 and 44 determines the thickness of the zinc dispersion layer 40 in the laminate 55 emerging from the rolls 43 and 44. In accordance with one example of the practice of the invention, a gap of 4 mils was maintained.

The sheet 49 is stripped from the laminate 55 and taken up on a driven takeup roll 58 mounted on a shaft 59 for rotation in the direction indicated by the arrow. The shaft 59 should be driven through a slip clutch, not shown.

The rest of the web 55, designated as 62 in FIGS. 5 and 7, passes over an idler roll 33 mounted on a journaled shaft 64 through dryers 65 and 66. The dryers 65 and 66 may be the same as described above. From the dryers, the web 62 passes to an idler roll 67 mounted on a shaft 68 for rotation in the sense indicated by the arrow.

The sheet 50 is stripped away from the finished dried laminate, designated 71 in FIGS. 5 and 8, and accumulated on a takeup roll 60 mounted on a shaft 61. The shaft 61 is driven in the direction indicated by the arrow by any conventional means, such as an electric motor or the like, not shown, which serves as the master drive for the system.

The dried laminate 71 is accumulated on a takeup roll 69, mounted on a shaft 70. The shaft 70 is preferably driven through a slip clutch, not shown, to avoid the need for synchronization with the shaft 61.

Dried laminates made in accordance with the invention described above may be stored on their takeup rolls until needed for use, and then slit and cut into appropriate pieces for assembly into batteries in the manner described in the above cited U.S. Pat. Nos. 4,124,742 and 4,125,685.

While the invention has been described with respect to the details of particular illustrative embodiments, many changes and variations will occur to those skilled in the art upon reading this description, and such can obviously be made without departure from the scope of the invention.

Having thus described the invention, what is claimed is:

1. The method of making a triplex laminate of cellophane, electrode particles and conductive plastic, comprising the steps of laminating under pressure a sheet of conductive plastic, a sheet of cellophane, and an intermediate layer of an aqueous dispersion of electrode particles and a binder in which said aqueous dispersion comes into contact with the conductive plastic sheet at least as soon as it comes in contact with the cellophane sheet, and drying said laminate to remove moisture from said dispersion by diffusion through said cellophane sheet.

2. The method of claim 1, in which said electrode particles comprise zinc.

3. The method of claim 1, in which said electrode particles comprise a major proportion of zinc and a minor proportion of carbon black.

4. The method of claim 1, in which said intermediate layer is formed by coating said conductive plastic sheet with said aqueous dispersion.

5. The method of claim 1, in which said intermediate layer is formed from a supply of said aqueous dispersion introduced between said sheets and reduced to a predetermined thickness during said lamination.

6. The method of claim 5, in which a pair of release sheets wider than said conductive plastic sheet and said cellophane sheet are laminated with said conductive plastic sheet, said cellophane sheet, and said intermediate layer with one of said release sheets adjacent said cellophane sheet and the other of said release sheets adjacent said conductive plastic sheet to contain any portion of said aqueous composition exuded beyond the borders of said cellophane and conductive plastic sheets, and further comprising the steps of removing said release sheet adjacent said cellophane sheet from the laminate of cellophane, electrode particles and conductive plastic before drying said laminate.

7. The method of claim 1, in which said lamination is performed by passing said sheets and said intermediate layer through a fixed gap between a pair of nip rolls.

8. The method of claim 7, in which said intermediate layer is formed by coating said conductive plastic sheet with said aqueous dispersion, and said coated conductive plastic sheet is fed into the gap between said nip rolls with said cellophane sheet.

9. The method of claim 7, in which said intermediate layer is formed by feeding said cellophane sheet and said conductive plastic sheet into the gap between said nip rolls while supplying said aqueous composition between said sheets into the nip between said rolls.

10. The method of claim 9, further comprising the steps of feeding a pair of release sheets wider than said conductive plastic and cellophane sheets into the gap between said rolls simultaneously with said conductive plastic and cellophane sheets with one of said release sheets adjacent said cellophane sheet and the other of said release sheets adjacent said conductive plastic sheet to contain any portion of said aqueous composition exuded beyond the borders of said cellophane and conductive plastic sheets, and removing at least said release sheet adjacent said cellophane sheet from the laminate of cellophane, electrode particles and conductive plastic before drying the laminate.

11. The method of claim 1 in which said electrode particles comprise a major proportion of zinc and a minor proportion of carbon black.

12. The method of forming a triplex laminate of zinc and carbon particles, cellophane and conductive plastic, comprising the steps of coating the conductive plastic side of a laminate of conductive plastic and a release sheet with an aqueous dispersion of zinc and carbon particles and a binder, laminating the coated laminate to a sheet of cellophane under pressure by passing the coated laminate and a sheet of cellophane between a pair of nip rolls spaced by a predetermined gap with the coated side of said coated laminate in contact with said cellophane sheet, removing said release sheet, and drying the laminate of cellophane, aqueous zinc dispersion and conductive plastic so formed in heated air.

13. The method of forming a triplex laminate of zinc and carbon particles, cellophane and conductive plastic, comprising the steps of feeding four sheets into a predetermined gap between a pair of nip rolls, said sheets comprising first and second inner sheets of a first width and third and fourth outer sheets of a second width wider than said first width, said first sheet being a sheet of cellophane in contact with said third sheet, and said second sheet being a sheet of conductive plastic in contact with said fourth sheet, supplying an aqueous dispersion of zinc and carbon particles with a binder between said first and second sheets in the nip between said rolls to produce an intermediate layer of said aqueous dispersion between said first and second sheets with a thickness determined by said gap, removing said third sheet, and drying said first, second and fourth sheets and said intermediate layer in heated air.

14. The method of making a triplex laminate of cellophane, electrode particles and conductive plastic, comprising the steps of coating a sheet of conductive plastic with an aqueous dispersion of electrode particles and a binder, laminating a sheet of cellophane to said coated plastic sheet under pressure with said aqueous dispersion coating in contact with said cellophane sheet, and drying said laminate to remove moisture from said dispersion by diffusion through said cellophane sheet.

15. The method of claim 14, in which said electrode particles comprise zinc.

16. The method of claim 14, in which said electrode particles comprise a major proportion of zinc and a minor proportion of carbon black.

17. The method of claim 14, in which said lamination is performed by passing said coated conductive plastic sheet and said cellophane sheet through a fixed gap between a pair of nip rolls.

18. The method of making a triplex laminate of cellophane, electrode particles and conductive plastic, comprising the steps of laminating under pressure a sheet of conductive plastic, a sheet of cellophane, and an intermediate layer of an aqueous dispersion of electrode particles and a binder, in which said intermediate layer is formed from a supply of said aqueous dispersion introduced between said sheets and reduced to a predetermined thickness during said lamination, and drying said laminate to remove moisture from said dispersion by diffusion through said cellophane sheet.

19. The method of claim 18 in which said electrode particles comprise zinc.

20. The method of claim 16, in which a pair of release sheets wider than said conductive plastic sheet and said cellophane sheet are laminated with said conductive plastic sheet, said cellophane sheet, and said intermediate layer with one of said release sheets adjacent said cellophane sheet and the other of said release sheets adjacent said conductive plastic sheet to contain any portion of said aqueous composition exuded beyond the borders of said cellophane and conductive plastic sheets, and further comprising the step of removing at least said release sheet adjacent said cellophane sheet from the laminate of cellophane, electrode particles and conductive plastic before drying said laminate.

* * * * *